United States Patent [19]

Riegler et al.

[11] 4,094,839

[45] June 13, 1978

[54] PREPARATIONS FOR COLORING MOLTEN THERMOPLASTIC POLYMERS

[75] Inventors: Albert Riegler, Basel; Werner Saar, Riehen; Volkhard Wiese, Pratteln, all of Switzerland

[73] Assignee: Ciba-Geigy Corporation, Ardsley, N.Y.

[21] Appl. No.: 622,308

[22] Filed: Oct. 14, 1975

[30] Foreign Application Priority Data

Oct. 22, 1974 Sweden .................................. 7414104

[51] Int. Cl.$^2$ ............................................. C08L 91/00
[52] U.S. Cl. ..................... 260/23 R; 260/23 S; 260/23 H; 260/23.7 R
[58] Field of Search ............ 260/27 EV, 23 R, 23 CP

[56] References Cited

U.S. PATENT DOCUMENTS 3,025,167   3/1962   Butler ............................. 260/27 EV

OTHER PUBLICATIONS

Adhesive's Age, 1960, pp. 31–36.

Primary Examiner—Melvyn I. Marquis
Attorney, Agent, or Firm—Vincent J. Cavalieri

[57] ABSTRACT

Preparations which contain 10 to 70% by weight of a pigment or a polymer-soluble colorant and 90 to 30% by weight of a carrier mixture which is composed of 51 to 95% by weight of a metal salt of an aliphatic carboxylic acid containing at least 12 carbon atoms, said metal selected from the group consisting of calcium, barium, zinc, aluminum, and magnesium, and of 49 to 5% by weight of an elastomeric or thermoplastic polymer are useful for coloring molten thermoplastic polymers in level shades.

9 Claims, No Drawings

PREPARATIONS FOR COLORING MOLTEN THERMOPLASTIC POLYMERS

It is known that preparations which, in addition to the pigment or polymer-soluble colourants, contain a carrier material are used with advantage for colouring molten thermoplastic polymers. Those preparations which contain an alkaline earth salt of an aliphatic carboxylic acid of at least 12 carbon atoms as carrier material have proved to be particularly useful (vide DOS 1.811.021 and 2.312.153). These preparations, however, have the disadvantage that, in granulated form, they are too brittle. Consequently, on account of abrasion during transportation and in modern pneumatic conveyor systems, these preparations create troublesome amounts of powdery material which severely contaminates machinery and plant.

The present invention provides preparations which do not have this disadvantage and which are characterised by very good stability and a substantially greater nonabrasiveness. The preparations of the present invention contain 10 to 70% by weight of a pigment or a polymer-soluble colourant and 90 to 30% by weight of a carrier material which is composed of 51 to 95% by weight of an alkaline earth salt or an aluminum or a zinc salt of an aliphatic carboxylic acid containing at least 12 carbon atoms and of 49 to 5% by weight of an elastomeric or thermoplastic polymer.

The pigments which form the basis of the preparations can belong to the most widely different chemical classes. As examples of organic pigments there may be mentioned: azo, azomethine, anthraquinone, phthalocyanine, nitro, perinone, perylenetetracarboxylic diimide, dioxazine, thioindigo, iminoisoindolinone or quinacridone pigments. Metal complexes, for example of azo, azomethine or methine dyes of pigment character, are also suitable. Examples of inorganic pigments are: carbon black, titanium dioxide, ferric oxide, chrome green, molybdate orange or ultramarine. It is also possible to use mixtures of different pigments.

Suitable polymer-soluble colourants are preferably:

a. disperse dyes, especially those of the anthraquinone, class, for example hydroxanthraquinones, aminoanthraquinones, alkylaminoanthraquinones, cyclohexylaminoanthraquinones, arylaminoanthraquinones or hydroxyaminoanthraquinones, phenylmercaptoanthraquinones, b. metal complexes of azo dyes, especially 1:2 chromium or cobalt complexes of monoazo dyes, c. salts, for example alkali, alkaline earth or ammonium salts of anthraquinonesulphonic acids.

Examples of such colourants are the 1:2 chromium complexes of o,o'-dihydroxymonoazo dyes described in Swiss Pat. No. 50 8005, the arylaminoanthraquinones cited in French patent application 2.081.678, the aminohydroxyanthraquinones cited in French patent application 2.081.678, the 1,4-diphenylamino-5,8-dihydroxyanthraquinones described in DOS 2.037.123, the azobenzanthrones cited in DOS 2.021.768, the cyclohexylamino- and toluidinoanthraquinones described in U.S. Pat. No. 3.487.041, the reaction products of aminoanthraquinones with monohaloarylketones described in DAS 1.128.066, or the phenylmercaptoanthraquinones described in DAS 1.282.933. From the class of anthraquinonesulphonic acids particular mention is to be made of the polymer-soluble salts of 1,4-di-(disulphoarylamino)anthraquinones, for example the 1,4-di-(2',4',6'-trimethyl-3'-sulphophenylamino)-anthraquinones.

It is also possible to use mixtures of different polymer-soluble colourants or mixtures thereof with pigments.

Both the pigments and the substrate-soluble colourants must of course be stable in the melt of the polymer to be coloured.

Preparations that have proved to be particularly satisfactory are those with a pigment or colourant concentration of 40-60% by weight.

The metal salts used as carrier in the preparations of the present invention contain as cations for example calcium, barium, zinc, aluminum and especially magnesium.

The anions of the salts are derived preferably from saturated or unsaturated aliphatic mono- or dicarboxylic acids containing 12 to 30, especially 16 to 24, carbon atoms. The aliphatic hydrocarbon chains of the acid radicals can be interrupted by bridge-forming members, for example oxygen or sulphur atoms, or by aromatic radicals. They can also have branched carbon chains. The following carboxylic acids may be cited as examples: capronic, caprinic, lauric, myristic, palmitic, stearic, arachinic, behenic, lignoceric, cerotic, xylylstearic, montanic, decyl-, dodecyl-, hexadecyl-, octadecyl- oxyacetic and -thioacetic acids, octyl- or nonylphenoxyacetic acids or phenylstearic acid. To be mentioned also are the salts of substituted fatty acids, for example of 12-oxystearic acid or ω-aminoundecanoic acid, or of unsaturated fatty acids, for example of undecylenic acid, oleic acid, linoleic acid, elaidic acid or ricinolic acid. It will be understood that it is also possible to use mixtures of salts of different acid radicals or cations.

Preferred thermoplastic polymers are copolymers of ethylene and vinyl esters of aliphatic carboxylic acids of 2 to 6 carbon atoms, especially vinyl acetate. The vinyl acetate content of these copolymers is preferably between 15 and 40% by weight.

Further suitable thermoplastics and/or elastomers are: homo- or copolymers of ethylene, propylene and butylene, of styrene, acrylonitrile, butadiene or polyamides.

The preparations are manufactured by intimately mixing the components, for example by grinding them in the presence of a liquid, preferably water or an organic solvent which does not dissolve the colourant.

Conventional ball or roll mills can be used, as desired. However, it is advantageous to use mills in which a charge of glass balls, porcelain or similar balls, or a charge of hard pebbles or sand, can be set in motion by means of a suitable stirrer. A feature common to such kinds of comminution devices is that the grinding elements are relatively freely movable and are capable of performing both frictional and impact movements.

On completion of the grinding operation the solvent is advantageously removed by evaporation.

The preparations of this invention may also be manufactured in a kneader. Processing is preferably carried out at elevated temperature in the presence of a grinding assistant, advantageously of an inorganic salt, for instance sodium chloride, potassium chloride, sodium sulphate or barium chloride. These salts are easy to wash out again with water. In certain cases it is advisable to add an organic solvent, preferably an organic solvent which is at least partially water-miscible and in which the colourant used may not be soluble. On completion of the kneading operation, the dough is advantageously treated with water to free it from salts and solvents.

In a preferred embodiment, the preparations according to the invention are manufactured by processing the dry, as a rule powdery homogenous mixture of pigment or polymer-soluble colourant, which may also contain additional assistants, in a continuously operating kneader or in an extruder in the fused state to give granules. The resulting granules can be readily mixed with the polymer granules, but in particular are highly suitable for melting in an injection extruder and injecting into the polymer melt to be coloured.

The pigment preparations of this invention can also be obtained by the so-called flush process, wherein an aqueous pigment paste is kneaded with a fatty acid containing 10 to 22 carbon atoms at elevated temperature, advantageously from 50 to 150° C. The water which is separated during the kneading is advantageously removed and the dough is further kneaded with a hydroxide or alcoholate of an alkaline earth metal, preferably magnesium or aluminium hydroxide, or also magnesium ethylate or aluminium isopropylate, while removing the water which forms, until a homogeneous preparation is obtained. As a rule it is advantageous to comminute the resultant preparations to a particle size suitable for application in thermoplastic polymers and conversion to granule form. The above processes can also be combined with one another.

The preparations are obtained by these processes in a form in which they can be easily incorporated into the polymers to be coloured. Examples of such polymers are: polymerisation resins, for example polyvinyl chloride, polyolefins, for example polyethylene, polypropylene, polybutadiene, polyisoprene, polystyrene, or copolymers of the corresponding monomers. The preparations of this invention are eminently suitable for incorporation into high-melting thermoplastic polymers, for example linear polyesters, in particular polyethylene terephthalate, polycarbonates, polyamides, for example those from adipic acid and hexamethylenediamine, ε-caprolactam or ω-aminoundecanoic acid.

The preparations are characterised by their rapid solubility and colour yield, and level and bright colourations are obtained in the above mentioned thermoplastic polymers. In addition, they can be readily incorporated in the polymers by melting them and mixing them with the molten polymer in an injection extruder.

The following Examples illustrate the invention, the parts and percentages being by weight unless otherwise stated.

EXAMPLE 1

500 parts of the red 1:2 chromium complex of the monoazo dye of formula

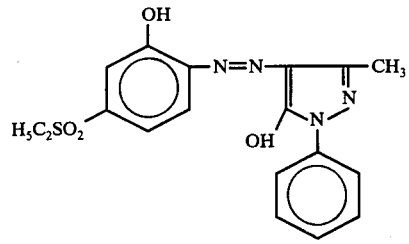

are mixed with 255 parts of magnesium stearate and 245 parts of an ethylene/vinyl acetate copolymer (registered trademark MICROTHENE MU 760, manufacturer: U.S.I.). This mixture is processed in a continuous laboratory kneader (system List) at 50°-110° C. The resultant nonabrasive and stable granules can be used for colouring molten polyamide.

Preparations with similar properties are obtained by using magnesium-12-oxystearate or magnesium montanate instead of magnesium stearate.

Use Example 98 parts of polyamide granules from ε-caprolactam are mixed with 2 parts of the granules of Example 1 and spun in an extruder at 290°-295° C. The filament obtained has an even red colouration with good light and wet fastness properties.

EXAMPLE 2

500 parts of the violet dye of formula

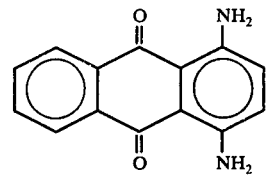

are mixed with 350 parts of magnesium behenate and 150 parts of a vinyl acetate copolymer (registered trademark MICROTHENE MU 760, manufacturer: U.S.I.). This mixture is processed in a continuous laboratory kneader (system List) at 40°-50° C. The nonabrasive and stable granules obtained can be used for colouring molten polyamide.

Preparations with similar properties are obtained by using calcium or zinc behenate instead of magnesium behenate.

EXAMPLE 3

A mixture of the following composition is prepared: 400 parts of carbon black (Sterling SO, Cabot) 180 parts of magnesium behenate and 180 parts of polyethylene/vinyl acetate copolymer (registered trademark MICROTHENE MU 760, manufacturer; U.S.I.).

This mixture is processed in a continuous laboratory kneader (system List) at 65°-108° C. The nonabrasive and stable granules obtained are used for example to pigment polypropylene and nylon.

The above procedure is repeated using 400 parts of β-copper phthalocyanine instead of carbon black, to yield a blue preparation containing 40% of pigment in nonabrasive and stable granule form. This preparation can be used for example to colour polypropylene and nylon.

EXAMPLE 4

158.7 parts of an aqueous paste containing 50 parts of the red azo dye of formula

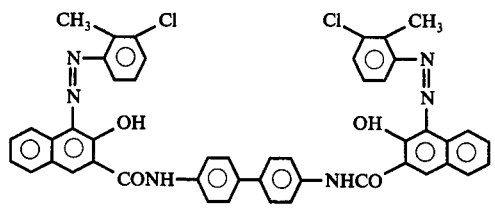

are finely ground in a sand mill at 45°–55° C with 32.3 parts of potassium behenate and 38.5 parts of water. The resultant suspension is separated from the sand and diluted with 2000 parts of water. With good stirring, a solution of 11.5 parts of MgSO$_4$·7H$_2$O in 300 parts of water is added dropwise at 50°–60° C. The pigment preparation which precipitates in the form of the magnesium salt is filtered off, washed free from salt, dried and pulverised. 80 parts of this preparation containing 62.5% of pigment are mixed with 20 parts of a vinyl acetate-modified polyethylene in powder form (e.g. MICROTHENE MU 760, manufacturer: U.S.I.). This mixture is processed in a continuous laboratory kneader (system List) at 50°–110° C. The nonabrasive and stable granules obtained of 50% pigment content can be used for colouring molten polypropylene.

Use Example 98 parts of isotactic polypropylene in the form of chips are mixed with 2 parts of the granules of Example 4 and spun in an extruder at 290°–295° C. The filament obtained has an even red colouration of good light and wet fastness.

EXAMPLE 5

48 parts of highly chlorinated copper phthalocyanine, 50.4 parts of magnesium behenate and 21.9 parts of polyethylene LD (e.g. Lupolen 1804 H, BASF) are processed for ¼ hour in a kneader at 140°–150° C. After a homogeneous mixture has been obtained, the product is cooled and comminuted. The preparation is processed in a laboratory extruder at 110°–140° C to give stable granules. A preparation containing 40% of pigment is obtained which can be used for colouring molten polyamide.

A preparation with similar properties is obtained by using a low molecular weight polystyrene (e.g. Escorez 7303, ESSO) instead of polyethylene.

EXAMPLE 6

600 parts of the orange 1:2 chromium complex of the monoazo dye of formula

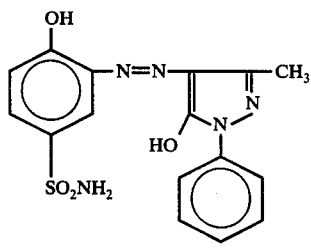

250 parts of magnesium behenate and 150 parts of a polyamide resin (e.g. Emerez 1530, Unilever-Emery) are mixed. This mixture is processed in a continuous laboratory kneader (system List) at 120°–140° C.

The resultant stable granules containing 60% of dye can be used for colouring molten polyamide.

A preparation with similar properties is obtained by using a copolymer of styrene and butadiene (e.g. Vestyron 512.31, Huls) instead of the polyamide resin.

EXAMPLE 7

86.7 parts of an aqueous paste containing 30 parts of the red pigment dye of formula

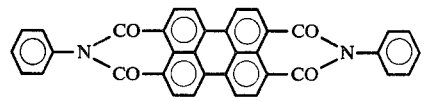

and 28.9 parts of erucic acid are processed in a kneader for ¼ hours at 60°. The water which has separated is poured off and then 2.5 parts of magnesium hydroxide and 60 parts of finely ground sodium chloride are added. Kneading is continued at 120° C and the water which forms is evaporated off.

After a homogeneous mixture has been obtained, the product is ground with water, filtered, washed free of salt, dried and pulverised.

60 parts of the preparation containing 50% of pigment are mixed with 15 parts of an ethylene/vinyl acetate copolymer (MICROTHENE MU 760, U.S.I.). This mixture is processed in a laboratory extruder at 100°–130° C to give stable granules. The preparation, which contains 40% of pigment, can be used for colouring molten polyamide.

We claim:

1. A preparation which contains 10 to 70% by weight of a pigment or a polymer-soluble colourant and 90 to 30% by weight of a carrier mixture which is composed of 51 to 95% by weight of a metal salt of an aliphatic carboxylic acid containing at least 12 carbon atoms, said metal selected from the group consisting of calcium, barium, zinc, aluminum, and magnesium, and 49 to 5% by weight of an elastomeric or thermoplastic polymer selected from the group consisting of a copolymer of ethylene and vinyl esters of aliphatic carboxylic acids of 2 to 6 carbon atoms, homo- or copolymers of ethylene, propylene, butylene, styrene, acrylonitrile, butadiene and polyamide.

2. A preparation according to claim 1, which contains a salt of a carboxylic acid of 16 to 24 carbon atoms.

3. A preparation according to claim 2, which contains a salt of behenic or stearic acid.

4. A preparation according to claim 1, which contains a magnesium salt of a carboxylic acid as indicated therein.

5. A preparation according to claim 1, which contains as polymer a copolymer of ethylene and vinyl acetate.

6. A preparation according to claim 5, which contains as polymer a copolymer of ethylene and vinyl acetate with a vinyl acetate content of 15 to 40% by weight.

7. A preparation according to claim 1, which contains 40 to 60% by weight of a pigment or of a polymer-soluble colourant.

8. A preparation according to claim 1, which contains 20 to 49% by weight of a polymer, referred to the total amount of carrier material.

9. A method of colouring molten thermoplastic polymers which comprises incorporating into said molten thermoplastic polymers, preparations according to claim 1.

* * * * *